(12) United States Patent
Mathews

(10) Patent No.: US 11,384,269 B1
(45) Date of Patent: Jul. 12, 2022

(54) DEICING AGENTS CONTAINING OXYGEN RELEASE COMPOUNDS

(71) Applicant: Alexander P Mathews, Manhattan, KS (US)

(72) Inventor: Alexander P Mathews, Manhattan, KS (US)

(73) Assignee: Alexander P. Mathews, Manhattan, KS (US)

( * ) Notice: Subject to any disclaimer, the term of this patent is extended or adjusted under 35 U.S.C. 154(b) by 0 days.

(21) Appl. No.: 17/507,622

(22) Filed: Oct. 21, 2021

(51) Int. Cl.
*C09K 3/18* (2006.01)

(52) U.S. Cl.
CPC ..................................... *C09K 3/18* (2013.01)

(58) Field of Classification Search
CPC ....................................................... C09K 3/18
See application file for complete search history.

(56) References Cited

U.S. PATENT DOCUMENTS

| 5,607,905 | A * | 3/1997 | Dobson, Jr. | ............ | C09K 8/514 |
| | | | | | 507/269 |
| 7,468,469 | B2 * | 12/2008 | Hollabaugh | ............ | C02F 1/722 |
| | | | | | 252/186.25 |
| 2015/0184046 | A1 * | 7/2015 | McConnell | ............ | G01N 33/18 |
| | | | | | 435/14 |

OTHER PUBLICATIONS

Baker, A.M., Calcium peroxide as a seed coating material for padi rice: I. Requirement for and provision of oxygen, Plant and Soil 99, 1987, 357-363. (Year: 1987).*

Bianchi-Mosquera, G.C., R.M. Allen-King, and D.M. McKay, Enhanced degradation of dissolved benzene and toluene using a solid oxygen releasing compound, Groundwater Monitoring Rem., 14, 1994, 120-128. (Year: 1994).*

Cassidy, D.P., and R.L. Irvine, Use of calcium peroxide to provide O2 for contaminant biodegradation in a saturated soil, J. Hazard Mater., 69, 1999, 25-39. (Year: 1999).*

Fischel, M., Evaluation of selected deicers based on a review of the literature, Report No. CDOT-DTD-R-2001-15, 2001, Colorado Department of Transportation, Denver, CO 80222. (Year: 2001).*

Horner, R.R., Environmental Monitoring and Evaluation of Calcium Magnesium Acetate (CMA), National Cooperative Highway Research Program Report 305, 1998, Transportation Research Board, National Research Council, Washington, D.C. (Year: 1998).*

Ramakrishna, D.M., and T. Viraraghavan, Environmental impact of chemical deicers—A review, Water, Air, and Soil Pollution, 2005, 166, 49-63. (Year: 2005).*

McQulling , J.P., and E.C. Opara, Methods for incorporating oxygen generating biomaterials in cell culture and microcapsule systems, Methods Mol Biol, 2017, 1479, 135-141. (Year: 2017).*

Northup, A., and D. Cassidy, Calcium peroxide (CaO2) for use in modified Fenton chemistry, Journal of Hazardous Materials, 2008, 152, 1164-1170. (Year: 2008).*

Wang, H., Y. Zhao, T. Li, Z. Chen, Y. Wang, and C. Qin, Properties of calcium peroxide for release of hydrogen peroxide: A kinetic study, Chemical Engineering Journal, 2016, 303, 450-457. (Year: 2016).*

* cited by examiner

*Primary Examiner* — Andrew J. Oyer

(57) ABSTRACT

The present invention provides environmentally benign deicing compositions comprising deicers or anti-icing agents with oxygen release compounds for the mitigation of dissolved oxygen depletion in receiving waters due to the decomposition of organic deicers. The compositions also include additives for the effective release of oxygen from metal peroxides and for pH control as needed.

15 Claims, No Drawings

DEICING AGENTS CONTAINING OXYGEN RELEASE COMPOUNDS

This invention was made with government support under Award No. 1940552, IIP Division, National Science Foundation.

FIELD OF THE INVENTION

This invention relates to road, airport, aircraft, and driveway deicing chemicals that tend to deplete oxygen in the receiving waters due to biodegradation. The present invention provides means to fully or partially replace the dissolved oxygen depleted due to deicer decomposition by incorporating oxygen release compounds into the deicer composition.

BACKGROUND OF THE INVENTION

Driving on roads and highways in winter can be hazardous due to the potential for snow and ice to cause accidents. Sodium chloride is commonly used as a deicing chemical to melt the snow and ice so as to provide safer driving conditions due to its effectiveness and low cost. In addition to sodium chloride, calcium chloride, and magnesium chloride are also used as deicing agents, particularly under very low ambient temperature conditions. However, all of these salts are highly corrosive and cause damage to road and highway infrastructure. Common problems include the spalling of concrete, corrosion of reinforcing steel, and the accelerated corrosion of automobiles. Moreover, these inorganic salts are not biodegradable, and hence accumulate in the environment causing damage to roadside vegetation and increase the salinity of surface and ground waters. The increase in sodium concentration in groundwaters used as source of drinking water is also a cause of concern due to the adverse impacts on human health. Deicers are also used on airport runways, aircrafts, sidewalks, and driveways. Chloride salts applied for these uses also suffer from the same corrosion and environmental problems noted above.

Several organic deicers are being used as full or partial replacements for sodium and other alkali or alkaline earth metal chlorides for road and airport runway deicing in many localities at present. There are also mixes of organic and inorganic deicers that can be and are being used for deicing applications. These organic deicers include synthetic agents such as calcium magnesium acetate (CMA), potassium acetate (KA), sodium acetate (NaA), calcium acetate (CA), magnesium acetate, sodium formate, potassium formate, hydroxycarboxylic acid salts, and wastes from agricultural and food processing operations that can cause a depression in freezing point. The latter include wastes from beet sugar processing, whey permeate, corn steep liquor, etc. Other metal carboxylates that have been formulated include calcium magnesium propionate (CMP), calcium propionate (CP), magnesium propionate (MP), salts of lactic acid, and mixtures of salts of carboxylic acids and hydroxycarboxylic acids, Polyethylene glycol is commonly used for aircraft anti-icing application. CMA and other organic deicers are advantageous in that are relatively benign in terms of corrosion of the highway and road infrastructure and airport and aircraft infrastructure. Moreover, they are biodegradable and hence will not accumulate in the environment. However, the biodegradation of CMA and other synthetic and natural organic deicers and anti-icing agents can cause the consumption of dissolved oxygen (DO) and depletion of DO in the receiving waters. This can cause undesirable anaerobic conditions that are harmful to the aquatic organisms in the receiving waters.

The present invention is aimed at reducing or eliminating the harmful effects associated with biodegradation of organic deicers and the concomitant reduction of DO in receiving waters. The invention provides a deicer composition containing the organic deicer that is effective in melting snow and ice, and oxygen containing compounds that can release oxygen to replace the oxygen that may be depleted during the biochemical decomposition of the organic deicer. This will prevent or reduce the conditions of low DO in the receiving waters or soils, thereby protecting the habitat for aquatic and soil organisms.

SUMMARY OF THE INVENTION

The present invention is aimed at minimizing dissolved oxygen impacts of deicing and anti-icing chemicals by providing deicer compositions that include oxygen release compounds (ORCs). The deicing chemicals that will benefit from the addition of ORCs include the currently used synthetic and natural organic deicers, and mixtures of organic and inorganic deicers. Similarly, anti-icing agents will also benefit from the addition of ORCs to prevent dissolved oxygen depletion in soils and receiving waters.

Calcium, magnesium, sodium, and potassium salts of acetic acid are currently being sold for use on roads and highways and airport runways, These may contain proprietary anti-corrosion additives and traction aid additives. However, these do not contain ORCs as additives. Sodium and potassium salts of formic acid and salts of acetic acid are used for airport and aircraft deicing applications. Glycols such as propylene glycol and ethylene glycol are also used for aircraft deicing applications. Acetates and formates in solution form are applied to roads as and-icers to prevent ice-pavement bonding. However, current deicing formulations do not contain oxygen release compounds.

The ORCS that will be used in the present invention encompass alkali and alkaline earth metal peroxides and percarbonates that decompose in the aqueous phase to release oxygen that can replace oxygen depleted due to biodegradation of the organic deicing chemicals and anti-icing agents. Specifically, the ORCs of primary interest in this invention are calcium peroxide and magnesium peroxide due to their rates of oxygen release and due to the benign nature of the decomposition products. Oxygen release from sodium percarbonate ($Na_2CO_3 \cdot 1.5H_2O$) is quite rapid and may not match biodegradation and oxygen depletion rates. However, percarbonates can be encapsulated in phyllosilicate or other materials to provide for a slower oxygen release.

ORCs have been used or studied for use in applications such as the bioremediation of contaminated groundwater, bioremediation of contaminated soils, improved seed germination in agriculture, and for reducing hypoxic conditions in tissue engineering. Examples of published papers and patents are: Bianchi-Mosquera, G. C., R. M. Allen-King, and D. M. McKay, Enhanced degradation of dissolved benzene and toluene using a solid oxygen releasing compound, *Groundwater Monitoring Rem.*, 1994, 14, 120-128; Cassidy, D. P., and R. L. Irvine, Use of calcium peroxide to provide $O_2$ for contaminant biodegradation in a saturated soil, *J. Hazard Mater.*, 1999, B69, 25-39; Baker, A. M., Calcium peroxide as a seed coating material for padi rice: I. Requirement for and provision of oxygen, *Plant and Soil*, 1987, 99, 357-363; McQulling J. P., and E. C. Opara, Methods for incorporating oxygen generating biomaterials in cell culture and microcapsule systems, *Methods Mol Biol*, 2017, 1479, 135-141; Hollabaugh, R., and. R. Schaffner, Jr., Dissolved Oxygen releasing compound, U.S. Pat. No. 7,468, 469 B2, 2008. In the present invention, ORCs will be used as additives to deicer compositions containing organic materials.

Dissolved calcium peroxide ($CaO_2$) and magnesium peroxide ($MgO_2$) will decompose according to the following overall reactions:

$$CaO_2 + H_2O \rightarrow Ca(OH)_2 + 0.5O_2$$

$$MgO_2 + H_2O \rightarrow Mg(OH)_2 + 0.5O_2$$

The rate of oxygen production is limited by the solubilities of solid $CaO_2$ and $MgO_2$ and the decomposition kinetics. The solubility of $CaO_2$ is two orders of magnitude higher than that of $MgO_2$ and hence will release oxygen at a relatively faster rate. The rate of oxygen release rate with either compound can be controlled by using bentonite or phyllosilicate materials as described in U.S. Pat. No. 7,468, 469. Granular formulation of the metal peroxides with inert compounds will tend to provide slow release of oxygen due to diffusion limitations in the peroxide and water reaction. The composition of the deicing and anti-icing chemicals containing ORCs can be formulated to meet the oxygen demand according to expected biodegradation rates. If the above reactions go to completion, 0.22 g of oxygen will be released per g of $CaO_2$ and 0.28 g oxygen per g of $MgO_2$. Sodium percarbonate will release 0.4 g oxygen per g of $Na_2CO_3 \cdot 1.5H_2O$.

The decomposition of metal peroxides involves two parallel reactions as noted below:

$$CaO_2 + H_2O \rightarrow Ca(OH)_2 + 0.5O_2$$

$$CaO_2 + 2H_2O \rightarrow Ca(OH)_2 + H_2O_2$$

In waters with no contaminants, oxygen and hydrogen peroxide will both be present with the quantities of each being determined by the environmental conditions such as the temperature and pH. Laboratory studies have shown that hydrogen peroxide yield is about 82% and oxygen yield 18% at pH 6, while at pH 9, the corresponding yields are 47% and 53% respectively (Northup and Cassidy, 2008). Higher temperatures also will also increase the oxygen yield and decrease hydrogen peroxide yield (Wang et al, 2016). Hydrogen peroxide will decompose in the presence of transition metal ions such as Fe, Mn, Cu, etc., to release oxygen as shown below.

$$H_2O_2 \rightarrow O_2 + 2H_2O$$

In most soils and waters, sufficient amounts of transition metal ions are present to steadily decrease the $H_2O_2$ concentration and increase the concentration of $O_2$ in soils and aquatic systems. $H_2O_2$ can retard microbial growth in areas where local accumulation occurs. However, due its decomposition and the release of $O_2$ microbial growth and degradation of organics will resume vigorously. Accordingly, this invention will also provide transition metal ions, in particular, iron compounds as an additive to the deicer for the effective decomposition of ORCs to $O_2$.

The dissolution and reaction of $CaO_2$ with water will generate hydroxide that will increase the pH of the receiving waters if sufficient buffer capacity is not available to absorb the base released. The present invention provides a deicer formulation that combats this potential rise in pH by including acidic components in the formulation. These acidic components may be selected from metal bicarbonates, metal phosphates or other compounds that can neutralize the base released. Metal bicarbonates that can be used include sodium bicarbonate or potassium bicarbonate, and metal phosphates include sodium or potassium dihydrogen phosphate.

The release of oxygen from metal peroxides is a function of the solubility of the peroxide in water. $MgO_2$ has a solubility that is about 100 times lower than that of $CaO_2$. Hence oxygen release from $MgO_2$ will be much slower than from $CaO_2$. A mixture of metal peroxides can be added to the deicer to provide oxygen release over a longer duration. Accordingly, the present invention will provide a formulation that includes the addition of a combination of metal peroxides to provide mitigation of oxygen depletion over a longer duration as may be required in some applications.

DETAILED DESCRIPTION OF THE INVENTION

This invention discloses deicer and anti-icing compositions containing oxygen release compounds for roadway, airport runway, and aircraft deicing and anti-icing applications. The ORCs will counteract the oxygen depletion that can occur in receiving waters or soils due to the biodegradation of organic compounds present in deicers. The ORC may be organic or inorganic. However, as organic compounds will exert oxygen demand, this invention is primarily focused on inorganic ORCs. Alkali and alkaline earth metal peroxides and metal percarbonates can serve as ORCs. This invention focuses primarily on the use of calcium and magnesium peroxides singly or in combination as ORCs. However, this invention is not limited to these two compounds, and other compounds such as percarbonates or other metal peroxides can be used alone or added as additives to the aforementioned peroxides.

As noted, the rate at which oxygen is released for a given environmental conditions is a function of the ORC chosen and the solubility of the compound. $CaO_2$ releases oxygen at a faster rate than $MgO_2$ due to its higher solubility. The rate of oxygen release can be slowed if need by using a mix of $CaO_2$ and $MgO_2$. The rate of oxygen release can also be slowed by encapsulating the peroxide in bentonite or other phyllosilicate materials.

The oxygen release rate is also a function of whether the $H_2O_2$ produced from the decomposition of metal peroxide is stable or decomposes to $O_2$. In natural waters transition metal ions such as Fe, Mn, may be present in sufficient quantities to catalyze the decomposition of $H_2O_2$. The laboratory data shown in Tables 1 and 2 indicate that $CaO_2$ decomposition can generate stable $H_2O_2$ which may be further decomposed by iron compound such as ferric chloride. In this example, 20 mg of powder containing 75% $CaO_2$ was added to tap water at 20° C. in a 300 mL BOD bottle and the DO was monitored over a period of five days. After five days, 0.1 mL of 0.1 molar solution of ferric chloride ($FeCl_3$) was added and the DO was monitored. The data indicate that additional oxygen is released with the addition of $FeCl_3$. As noted previously, the amount of hydrogen peroxide and oxygen generated from the decomposition of metal peroxides is a function of their solubilities, pH, and temperature. Depending on the field site conditions and the environment, addition of transition metal ions would be useful in the full decomposition of $CaO_2$ to obtain the maximum amount of oxygen. Accordingly, this invention also includes deicer compositions containing transition metal ions, in particular, iron compounds.

TABLE 1

DO from calcium peroxide decomposition without $FeCl_3$

| | Time, hr | | | | | | | | |
|---|---|---|---|---|---|---|---|---|---|
| | 0 | 1 | 3 | 5 | 7 | 24 | 48 | 72 | 96 | 120 |
| DO, mg/L | 9.47 | 9.90 | 10.26 | 10.49 | 10.64 | 11.46 | 11.42 | 11.23 | 11.17 | 11.17 |

TABLE 2

DO from calcium peroxide decomposition after $FeCl_3$ addition

| | Time, hr | | | | | |
|---|---|---|---|---|---|---|
| | 0 | 1 | 2 | 24 | 48 | 72 |
| DO, mg/L | 11.17 | 11.40 | 11.46 | 12.19 | 12.79 | 12.69 |

The oxygen demand of organic matter from the degradation by microorganisms is measured using the standard biochemical oxygen demand (BOD) test. The test method is available in the Standard Methods for the Examination of Water and Wastewater, 23$^{rd}$ Edition (American Water Works Association, 2017). Standard BUD tests require the preparation of dilution water that contains nutrients conducive to the growth of microorganisms, aeration of this water and the addition of bacterial seed for biodegradation. In examples listed below, 6 L of dilution water was prepared using deionized water by adding 0.135 g $MgSO_4 \cdot 7H_2O$, 0.165 g $CaCl_2$, 0.003 g $FeCl_3$, 0.186 g $KH_2PO_4$, 0.131 g $K_2HPO_4$, 0.2004 g $Na_2HPO_4$, and 0.0102 g $NH_4Cl$. This composition provides additional 0.135 g $KH_2PO_4$ for base neutralization from $CaO_2$ decomposition, and 0.0015 g additional $FeCl_3$ to catalyze $H_2O_2$ decomposition.

EXAMPLE 1

Effect of Calcium Peroxide on Dissolved Oxygen with CMA Biodegradation

BOD tests were conducted using aerated dilution water as noted above in 300 mL BOD bottles. Tests were conducted in duplicate and average results are reported here. Each BOD bottle was prepared with the prescribed amount of CMA solution, calcium peroxide, and 3 mL of influent wastewater obtained from the City of Manhattan, Kans. wastewater treatment plant as bacterial seed. The initial CMA concentration in each BOD bottle was 10 mg/L. The CMA had calcium to magnesium mole ratio of 4 to 6. The $CaO_2$ as supplied contained 75% $CaO_2$. A 5 mg $CaO_2$ dose to the 300 mL BOD bottle corresponds to 12.5 mg/L 100% $CaO_2$. The 10 mg dose corresponds to 25 mg/l 100% $CaO_2$. The BOD bottles were placed in an incubator set at 20° C. Initial DO was measured, and the DO was monitored over the course of 11 days. Initial and final pH values were monitored.

Table 3 shows that without the addition of $CaO_2$ the biodegradation of CMA results in the depletion of 8.4 mg/L of dissolved oxygen in five days and the DO concentration is 1.1 mg/L at the end of five days. When 5 mg of 75% $CaO_2$ is added, the DO is 3.47 mg/L after five days and 2.62 mg/L after 11 days. With the addition of 10 mg of 75% $CaO_2$ the DO is 4.4 mg/L after five days, and 4.3 mg/L after 11 days. These data show that the addition of ORCs can help mitigate the adverse effects of DO depletion from the biodegradation of organic deicers. In field applications, the amount of $CaO_2$ required will vary depending on the local conditions. In most cases, the temperature may be close to around 0° C. to 10° C., and the DO levels will be high. Hence the amount of $CaO_2$ required will be less to assure desired DO levels to protect aquatic organisms in the receiving waters. The amount of $CaO_2$ required will also be a function of the proximity of the waters to be protected are from the point of application. If water bodies to be protected are adjacent to roadways or airports, the dispersion effects will be low and hence higher ORC doses may be required.

TABLE 3

Biodegradation of 10 mg/L CMA and the effect of $CaO_2$ on dissolved oxygen

| Time, days | DO, mg/L 0 mg $CaO_2$ | DO, mg/L 5 mg $CaO_2$ | DO, mg/L 10 mg $CaO_2$ |
|---|---|---|---|
| 0 | 9.51 | 9.76 | 9.90 |
| 1 | 4.09 | 7.23 | 9.58 |
| 2 | 2.32 | 4.87 | 6.19 |
| 3 | 1.58 | 4.10 | 5.35 |
| 5 | 1.10 | 3.47 | 4.40 |
| 9 | 1.02 | 3.17 | 4.25 |
| 11 | 0.99 | 2.62 | 4.30 |

EXAMPLE 2

Effect of $CaO_2$ on Dissolved Oxygen with Formate Biodegradation

Sodium formate or potassium formate is typically used at airports for runway deicing and aircraft anti-icing applications. This is due to the fact that BODs of formates are lower than that of acetates. The depletion of oxygen from biodegradation of sodium formate was tested using the standard BOD test. The sodium formate concentration tested was 10 mg/L. The procedure used was identical to that used for Example 1. The results from tests are shown in Table 4.

In the absence of $CaO_2$ the DO decreased by 6.27 mg/L to 3.26 mg/L in 11 days. When 5 mg/L of 75% $CaO_2$ is present, the DO is 7.66 mg/L after 11 days. In the case of 10 mg of 75% $CaO_2$ addition, the DO is higher than the initial value due to unused oxygen from the decomposition of $CaO_2$. The requirement for $CaO_2$ for field applications will depend on the site conditions and weather during the time of application and thereafter.

TABLE 4

Biodegradation of 10 mg/L sodium formate and the effect of $CaO_2$ on dissolved oxygen

| Time, days | DO, mg/L 0 mg $CaO_2$ | DO, mg/L 5 mg $CaO_2$ | DO, mg/L 10 mg $CaO_2$ |
|---|---|---|---|
| 0 | 9.53 | 9.80 | 10.01 |
| 1 | 8.64 | 10.53 | 11.06 |
| 2 | 7.82 | 10.24 | 11.29 |
| 3 | 7.33 | 9.85 | 11.14 |
| 5 | 6.42 | 9.37 | 11.00 |
| 9 | 4.62 | 7.99 | 10.90 |
| 11 | 3.26 | 7.66 | 10.72 |

The above examples indicate the addition of ORCs can mitigate the effects of oxygen depletion in rivers, lakes, and groundwaters due to the biodegradation of organic deicers and anti-icing agents applied for snow and ice control on roads and bridges, at airports, and on sidewalks and driveways. The fate and transport of road deicing chemicals after their application is a complex process. CMA application rates vary according to climate and maintenance practices and range from 250 to 400 lbs/lane mile. Due to dispersion, absorption in soils, and aerobic and anoxic decompositions, only a fraction of the original amount applied will reach surface and ground waters (Ramakrishna and Viraraghavan, 2005). The dilution of deicers from roadways to nearby streams is estimated to range from 100 to 500-fold (Fischel, 2021). Less than 10% of acetate applied to field plots appeared in runoff or groundwater. The concentration of CMA in the runoff from highways is estimated to be between 10 mg/L to 100 mg/L (Horner, 1988). Thus, the ORC amount that needs to be added to the deicer will vary greatly depending on weather and local site conditions.

This invention intends to use an ORC percentage of 1% to 30% of the total weight of organic deicer to provide the necessary oxygen to mitigate oxygen depletion effects. A more preferred range would be 1% to 10% of the weight of the organic deicer. The actual percentage to be used will depend on the organic deicer being used, the weather conditions including temperatures anticipated, proximity of the application point to receiving waters, and other local factors. The deicer composition of this invention will also include iron compounds or transition metal ion compounds to promote the decomposition of hydrogen peroxide to provide maximum oxygen release from ORCs. The deicer composition of this invention will also include acidic compounds such as metal bicarbonates or metal phosphates for pH control.

What is claimed is:

1. A deicer composition comprising (a) an organic deicer or a combination of organic deicer and inorganic deicer; (b) one or multiple oxygen release compounds (ORCs) added in the proportion of 0.5% to 30% by weight to the weight of organic deicers in the deicer composition for the purpose of mitigating oxygen depletion effects of organic deicers due to biodegradation in waters and soils.

2. An anti-icer composition comprising (a) an organic anti-icer or a combination of organic anti-icer and inorganic anti-icer; (b) one or multiple oxygen release compounds added in the proportion of 0.5% to 30% by weight to the weight of organic anti-icers in the anti-icer composition for the purpose of mitigating oxygen depletion effects of organic compounds that are present in anti-icer formulations.

3. A composition according to claim 1 to which one or more transition metal compounds are added to catalyze oxygen release from ORCs when such transition metal ions are not present in the soil or water.

4. A composition according to claim 2 to which one or more transition metal compounds are added to catalyze oxygen release from ORCs when such transition metal ions are not present in the soil or water.

5. A composition according to claim 1 to which acidic compounds are added when such acidic compounds are not present in the soil or water to neutralize the base released by the ORCs.

6. A composition according to claim 2 to which acidic compounds are added when such acidic compounds are not present in the soil or water to neutralize the base released by the ORCs.

7. A deicer composition according to claim 1 wherein the ORC is chosen from metal peroxides, metal percarbonates or combinations thereof.

8. A deicer composition according to claim 1 wherein the organic deicer is chosen from:
   (a) synthetic organic compounds including alkali carboxylates, alkaline earth carboxylates, or hydroxycarboxylic acid salts;
   (b) natural organic material including beet sugar processing wastes, whey permeates, corn steep water, or other agricultural and food processing waste byproducts;
   {c) combination synthetic and natural organic materials as described in (a) and (b).

9. A deicer composition according to claim 1 wherein the organic deicer or a combination of organic and inorganic deicer is in liquid, powder, granular, or solution form and is formulated with additives including corrosion inhibitors, inert materials, or other ingredients to improve traction.

10. An anti-icer composition according to claim 2 wherein the organic anti-icer or a combination of organic anti-icer and inorganic anti-icer is in liquid, powder, granular, or solution form and is formulated with additives including corrosion inhibitors, inert materials, or other ingredients to improve traction.

11. A deicer composition according to claim 1 wherein the ORC is in liquid, powder, granular, or solution form, or in encapsulated form.

12. An anti-icer composition according to claim 2 wherein the ORC is in liquid, powder, granular, or solution form, or in encapsulated form.

13. A deicer composition according to claim 1 wherein the organic deicer is alkali or alkaline earth metal salts of acetic acid or combinations thereof, and the ORC is calcium peroxide added in the proportion of 0.7% to 20% calcium peroxide by weight to the weight of acetate in the deicer.

14. A deicer composition of claim 1 wherein the organic deicer is alkali or alkaline earth metal salts of formic acid or combinations thereof, and the ORC is calcium peroxide added in the proportion of 0.5% to 10% calcium peroxide by weight to the weight of formate in the deicer.

15. A deicer composition of claim 1 wherein the organic deicer is acetate or formate salt of alkali or alkaline earth metals and combinations thereof, and calcium peroxide used as the metal peroxide is supplemented with iron as transition metal in the form of ferric chloride in the proportion of 2% to 5% of the weight of 100% calcium peroxide.

* * * * *